United States Patent
Mansfeld et al.

(10) Patent No.: US 6,305,217 B1
(45) Date of Patent: Oct. 23, 2001

(54) STEERING WHEEL MOUNTED TEST DEVICE

(76) Inventors: Jurgen Mansfeld, Schmithofer Strasse 43; Eckhard Schulz, Schwinning Strasse 91, both of 52076 Aachen (DE)

( * ) Notice: Subject to any disclaimer, the term of this patent is extended or adjusted under 35 U.S.C. 154(b) by 0 days.

(21) Appl. No.: 08/975,791

(22) Filed: Nov. 21, 1997

(30) Foreign Application Priority Data

Nov. 21, 1996 (DE) ........................................ 296 20 236 U

(51) Int. Cl.$^7$ ................................................. G01M 15/00
(52) U.S. Cl. ..................... 73/117.2; 73/116; 224/276; 248/27.3; 340/425.5; 340/438
(58) Field of Search .................... 73/117.2, 116; 224/276; 248/27.3; 307/10.1; 340/425.5, 438, 439, 441, 457

(56) References Cited

U.S. PATENT DOCUMENTS

| | | | |
|---|---|---|---|
| 2,810,221 | * 10/1957 | Reifsnyder | ................................ 40/10 |
| 4,638,287 | * 1/1987 | Umebayashi et al. | ................. 340/22 |
| 4,850,015 | * 7/1989 | Martin | ................................ 379/428 |
| 4,917,130 | 4/1990 | Sweder . | |
| 5,177,665 | 1/1993 | Frank et al. . | |
| 5,487,521 | 1/1996 | Callahan . | |
| 5,541,572 | * 7/1996 | Okamoto et al. | ..................... 340/438 |
| 5,542,314 | 8/1996 | Sullivan et al. . | |

* cited by examiner

Primary Examiner—Eric S. McCall
(74) Attorney, Agent, or Firm—Reising, Ethington, Barnes, Kisselle, Learman & McCulloch, P.C.

(57) ABSTRACT

A diagnostic test device for mounting to an automobile steering wheel comprises a housing having a control panel, an electronic circuit, and one or more supports adapted to mount the housing on the outer ring of the automobile steering wheel. The electronic circuit is contained within the housing and has an input for receiving diagnostic information from the automobile. One or more supports are located relative to the lower surface of the housing such that the lower surface is located above the center hub of the steering wheel when the housing is supported on the outer ring of the steering wheel by the supports. The distance between the lower surface of the housing and the geometric center of the outer ring of the steering wheel is greater than or equal to seventy percent (70%) of the radius of the outer ring at the closest point between the lower surface and the geometric center.

21 Claims, 4 Drawing Sheets

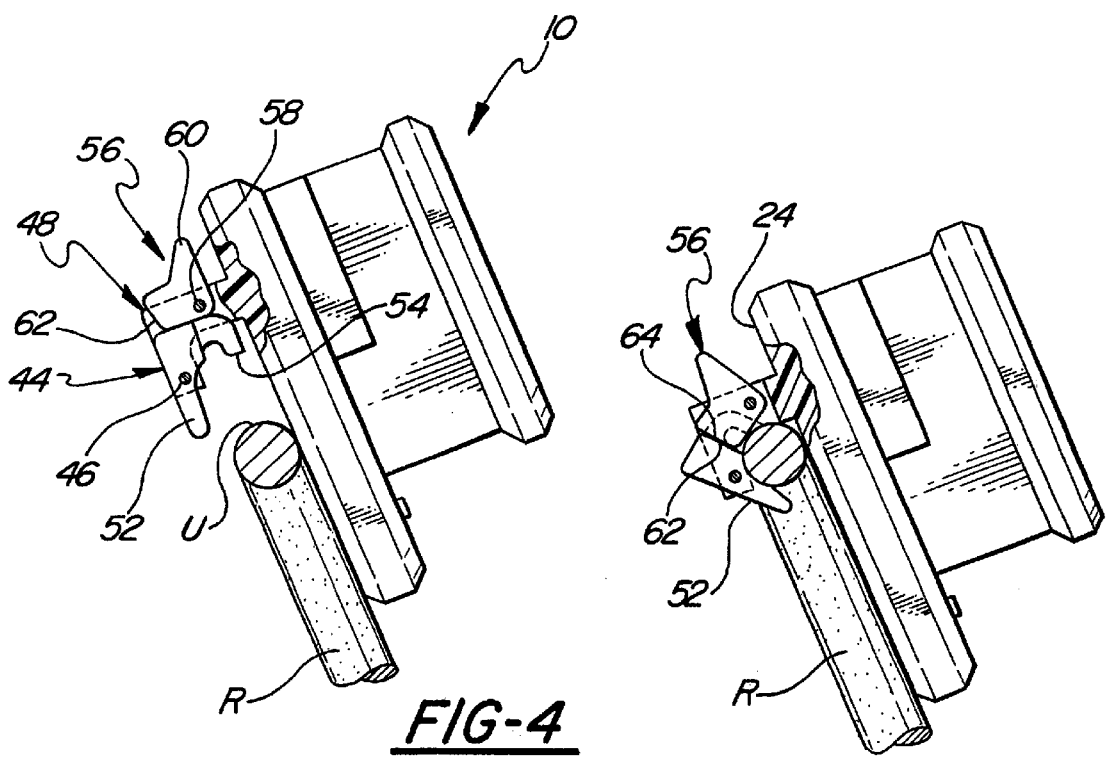
FIG-4
FIG-5
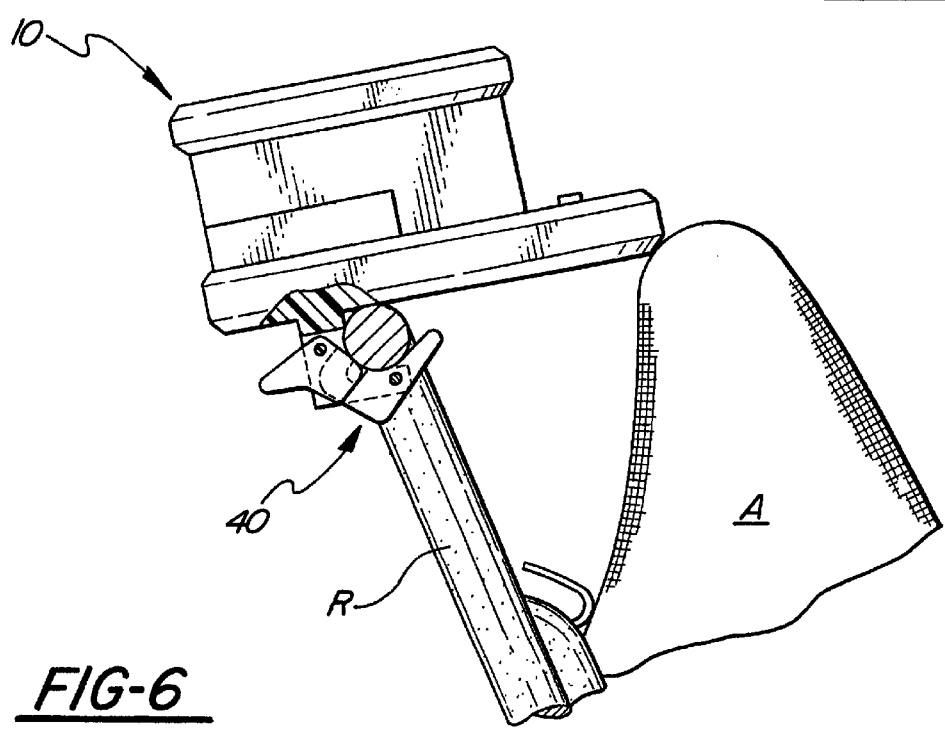
FIG-6

STEERING WHEEL MOUNTED TEST DEVICE

TECHNICAL FIELD

This invention relates in general to diagnostic test devices for use in automobiles to retrieve data from the automobile and to verify proper functioning of various components and systems of the automobile and, in particular, this invention relates to the mounting of such devices onto the automobile's steering wheel.

BACKGROUND OF THE INVENTION

Most modern automobiles now come equipped with a communications interface for retrieval of data and other diagnostic information from the automobile. This information is accessed by a diagnostic test device using an electrical connector that plugs into the communications interface. These test devices are mostly portable units that are easily carried by the test operator. They can include a display and input buttons used to provide input commands to the automobile through the communications interface.

Typically, the testing process requires the operator to sit in the driver's seat of the automobile and to input commands into the test device, view information displayed by the test device, and operate some or all of the driver controls, including the ignition switch, transmission shift lever, climate control system, windshield wiper switch, acceleration and brake pedals, headlight switches, and so forth. This usually requires that the test device be placed in the operator's lap or on the vehicle seat next to the operator, making it more difficult to access the input buttons or view the display.

One possible solution to this problem is to temporarily mount the test device onto the steering wheel for easy, hands-free access by the test operator. However, diagnostic and validation testing of the type contemplated herein is typically carried out after assembly of the vehicle is substantially or entirely complete. For most modern vehicles, this means that a driver's side airbag has already been installed into the center hub of the steering wheel. The existence of an operational driver's side airbag carries with it the possibility of an unintentional deployment of the airbag during the testing process. For a test device mounted on the steering wheel either partially or wholly overlapping the center hub, there is also the possibility that deployment of the airbag could cause the test device to become disengaged from the steering wheel and create a potential hazard for the test operator or others nearby.

SUMMARY OF THE INVENTION

The present invention overcomes the above-noted shortcomings of conventional diagnostic test devices by providing a test device which includes a housing having at least one support for mounting the device onto the outer ring of the steering wheel, with the support being located relative to the lower surface of the housing such that the lower surface is located above the center hub of the steering wheel when the device is mounted onto the steering wheel. In this way, the test device sits above the center hub so that it is not located in the path of the airbag should an unexpected deployment occur.

Preferably, the test device is designed so that the distance between the lower surface of the housing and the geometric center of the steering wheel is greater than or equal to seventy percent (70%) of the radius of the outer ring. The support can be an arcuate slot located in the bottom of the housing, with the curvature of the arcuate slot being equal to that of the outer ring of the steering wheel. To further remove the device from the deployment area of the airbag, the support can be located toward the front of the housing so that most of the housing and its contents are located behind the steering wheel.

In accordance with another aspect of the present invention, there is provided a diagnostic test device in which the housing has a lower surface that includes a middle region and a pair of end regions, each of which extends downwardly from an opposite end of the middle region such that the middle region is located above the hub of the steering wheel when the device is secured to the steering wheel. As a result, the test device housing generally follows the curvature of the outer ring, thereby keeping any part of the housing away from the center hub where deployment of the airbag occurs. Preferably, each of the end regions of the lower surface of the housing extend downwardly from the middle region at an obtuse angle.

In accordance with yet another aspect of the invention, there is provided a diagnostic test device in which the housing is mounted to the outer ring of the steering wheel using a clamp that when latched, prevents the test device from becoming disengaged from the steering wheel, even under the forces exerted by an expanding airbag, while allowing the test device to rotate about the outer ring away from the operator and toward the instrument panel. By so limiting the movement of the test device, this arrangement helps prevent injury to the operator and others. Preferably, the test device also includes one or more support blocks that partially support the test device on the steering wheel, yet do not interfere with rotation of the test device about the outer ring in the event of an airbag deployment.

The clamp can include a latching member that latches the test device into place automatically upon mounting of the test device on the outer ring. This can be accomplished using a control link that rotates when the test device is being mounted and that causes concomitant rotation of the latching member into the latched position. Preferably, the clamp includes a locking pawl that, following movement of the latching member to the latched position, automatically engages the latching member to prevent it from rotating back to the unlatched position. The locking pawl can be manually disengaged from the latching member by the operator to allow the test device to be removed from the steering wheel.

BRIEF DESCRIPTION OF THE DRAWINGS

A preferred exemplary embodiment of the present invention will hereinafter be described in conjunction with the appended drawings, wherein like designations denote like elements, and:

FIG. 4 is a side view of the test device of FIG. 1 showing the clamp prior to mounting of the test device onto the steering wheel;

FIG. 5 is a side view as in FIG. 4 showing the clamp locked onto the steering wheel;

FIG. 6 is a side view as in FIGS. 4 and 5 depicting the rotation of the test device about the outer ring of the steering wheel due to deployment of a driver's side airbag;

DETAILED DESCRIPTION OF THE PREFERRED EMBODIMENTS

Figure 1:
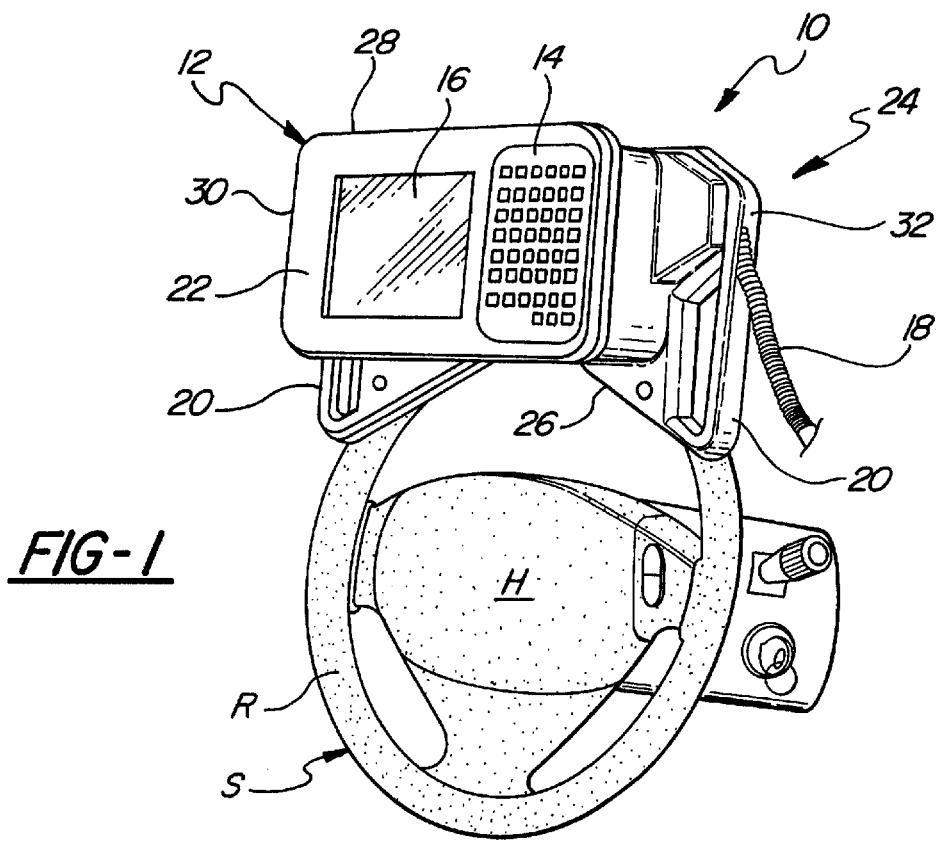
FIG. 1 is a perspective view of a first embodiment of a diagnostic test device of the invention, showing it mounted on an automobile steering wheel.
Figure 2:
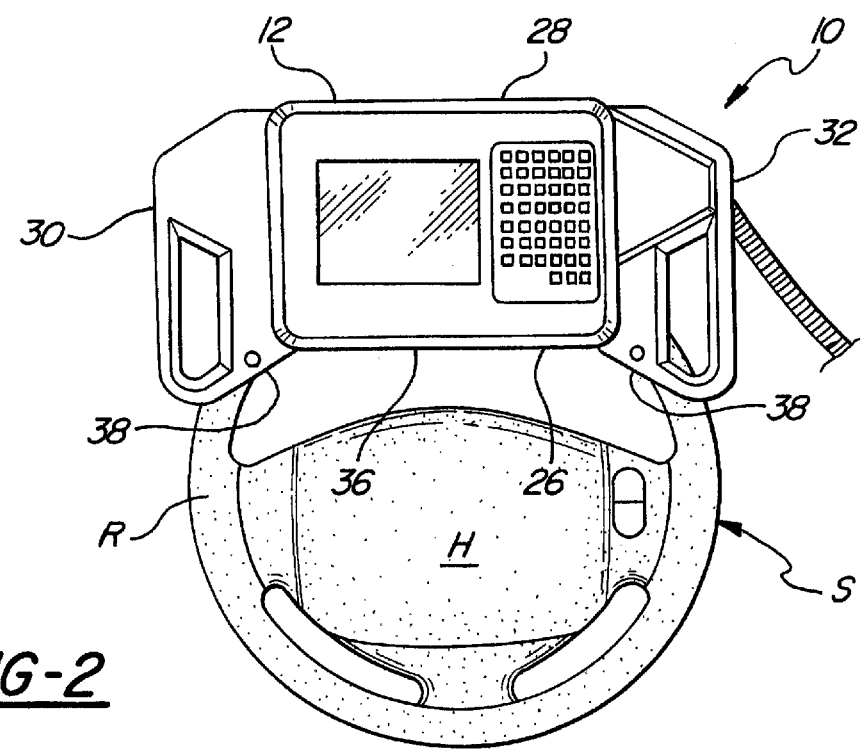
FIG. 2 is a front view of the test device of FIG. 1.

As shown in FIGS. 1 and 2, a diagnostic test device of the present invention, designated generally as 10, includes a housing 12, control panel 14, display 16, interface cable 18, and a pair of handles 20 located at opposite ends of housing 12. Housing 12 includes a front side or front face 22, a back face 24, a lower surface 26, an upper surface 28, a left side 30, and a right side 32. Contained within housing 12 is an electronic circuit of which control panel 14, display 16, and interface cable 18 are a part.

As will be described in greater detail below, test device 10 is adapted to be secured to the outer ring R of the automobile's steering wheel S such that the lower surface 26 is located above the center hub H of the steering wheel. In this way, the test device can be located partially or even completely outside of the deployment area of a driver's side airbag stored in the center hub. Mounting of test device 10 in this manner can be accomplished in any of several ways, as will be described.

Figure 3:
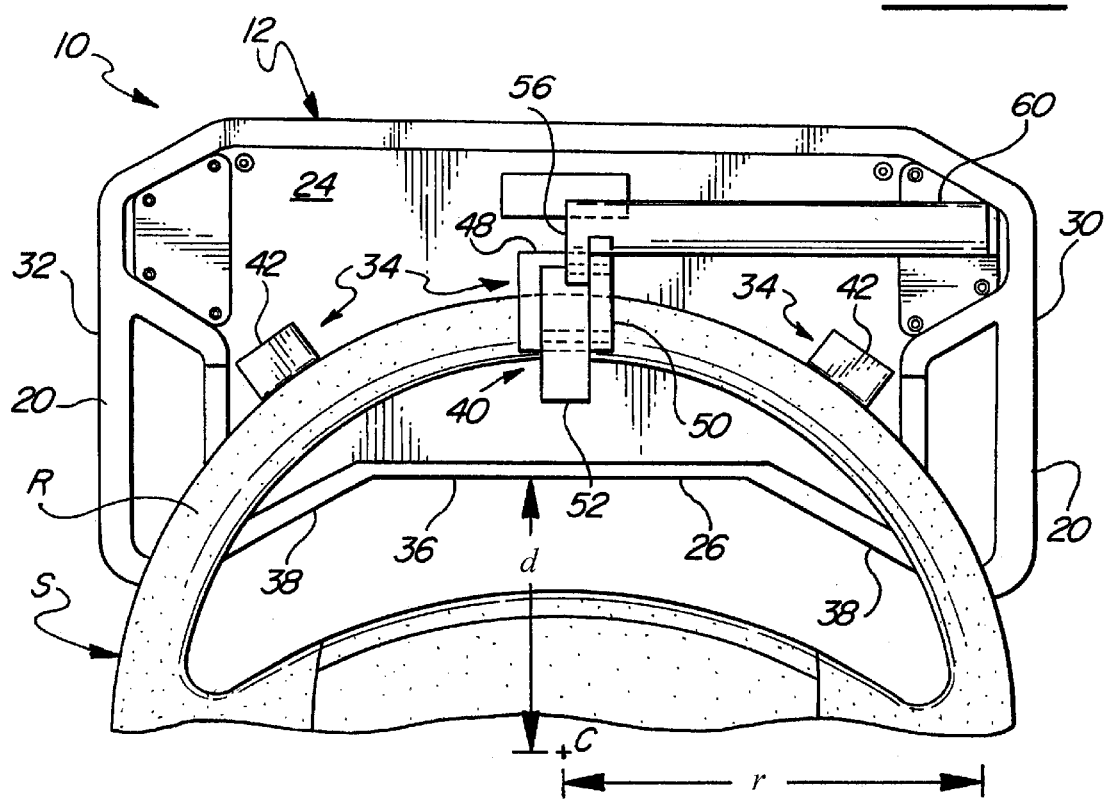
FIG. 3 is a rear view of the test device of FIG. 1 depicting the manner in which the test device is supported and clamped to the steering wheel.

Referring now to FIG. 3, one such arrangement for mounting test device 10 is shown. In this embodiment, test device 10 includes a set of supports 34 that are positioned on the housing 12 so that lower surface 26 is located above the center hub H of steering wheel S. Supports 34 are attached to the back face 24 of test device 10 and are spaced from each other to provide a stable support for housing 12. The location of supports 34 is selected so that, when test device 10 is attached to the outer ring R using supports 34, the test device sits high enough on the steering wheel that the distance (d) between the lower surface 26 of housing 12 and the geometric center (c) of the steering wheel S is no less than seventy percent (70%) of the radius (r) of the outer ring R of the steering wheel.

Figure 9:
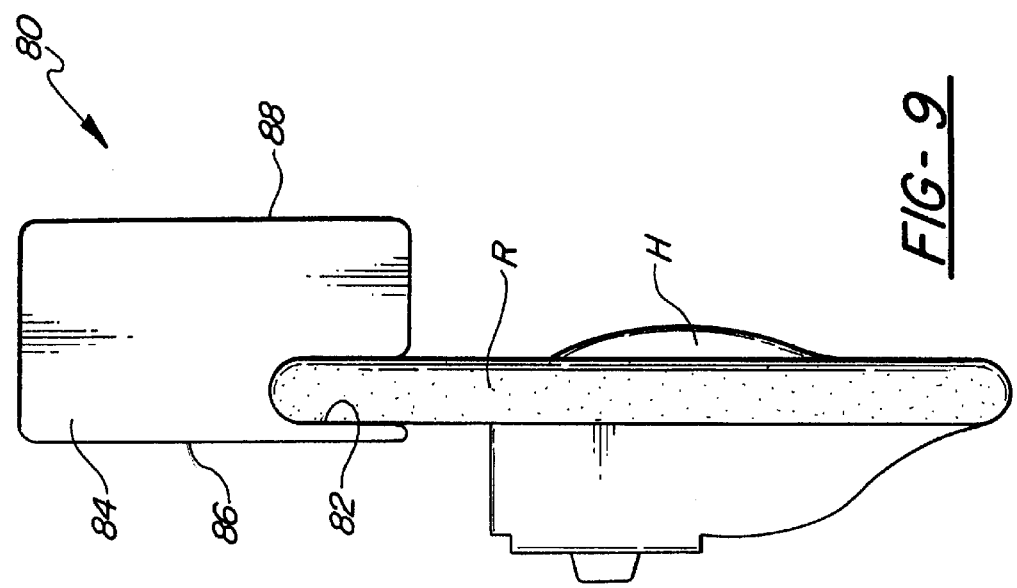
FIG. 9 is a side view of the test device of FIG. 8 showing the slot used to mount the test device onto the steering wheel.

To help keep test device 10 out of the path of an expanding airbag, the lower surface 26 has a conformation that generally follows the curvature of the outer ring, thereby keeping all parts of the housing away from the center hub where deployment of the airbag occurs. In particular, lower surface 26 has a middle region 36 and a pair of end regions 38, each of which extends downwardly at an obtuse angle from an opposite end of middle region 36. Referring briefly to FIG. 9, it can seen that, in the embodiment shown therein, the middle and end regions join to form an arcuate lower surface 26 that is continuous from one region to the next.

Turning back to FIG. 3, the center support 34 comprises a clamp 40 and the other two supports comprise support blocks 42. Clamp 40 is used to lock housing 12 into place on the steering wheel and, in the event of an unexpected airbag deployment, clamp 40 limits movement of the test device to rotation about the outer ring R at the point of engagement of clamp 40 with the outer ring. Clamp 40 also prevents test device 10 from slipping off the steering wheel in the event the steering wheel is rotated in one direction or the other. The construction and operation of clamp 40 can be best understood by reference to FIGS. 4–6 which depicts a partial cross-sectional view of clamp 40 and which depicts test device 10 without support blocks 42 for the purpose of clarity.

In general, clamp 40 locks the test device 10 onto the steering wheel S automatically as a result of the test device being hung onto the steering wheel by the operator. A locking member rotates into position upon the clamp latching the test device to the steering wheel and must be manually actuated to unlock the clamp from the steering wheel. More specifically, as shown in FIGS. 4–6, clamp 40 includes a latch 44 pivotally connected by a pin 46 to a support post 48 that is rigidly connected to housing 12. Support post 48 extends rearwardly from housing 12 and has a downwardly extending flange 50 (FIG. 3) through which pin 46 extends.

Latch 44 includes a downwardly extending latching member 52 and a control link 54 which together can be formed from a single piece of metal. Comparing FIGS. 4 and 5, it will be seen that, as test device 10 is placed onto the steering wheel, the upper surface U of the steering wheel's outer ring R comes into contact with control link 54 causing latch 44 to rotate about pin 46. This results in latching member 52 moving to a latched position in which the outer ring R is captured between latch 44 and the back face 24 of housing 12. Thus, latching member 52 moves from an unlatched position shown in FIG. 4 to the latched position shown in FIG. 5.

As briefly mentioned above, clamp 40 also includes a locking member or pawl 56 that is used to lock latching member 52 into the latched position so that test device 10 cannot be lifted upwards off the steering wheel. Locking pawl 56 is pivotally connected to support post 48 by a pin 58. At one end of locking pawl 56 is a release arm 60 that allows the operator to manually unlock clamp 40 and that extends across the back face 24 of housing 12 to a position adjacent one of the handles 20. At the other end of locking pawl 56 is a bearing surface 62 that mates with a complementary bearing surface 64 of latching member 52 when it is rotated to the latched position shown in FIG. 5. More specifically, locking pawl 56 pivots between an unlocked position in which latching member 52 can move between the latched and unlatched positions and a locked position in which latching member 52 is prevented from moving from the latched position to the unlatched position. In the unlocked position shown in FIG. 4, the bearing surface 62 of locking pawl 56 is not in contact with latching member 52 and does not interfere with its movement between the unlatched and latched positions. Rather, locking pawl 56 is maintained in its unlocked position by the engagement of its lower edge with the top edge of latching member 52. When latching member 52 rotates to the latched position shown in FIG. 5, the top edge of latching member 52 no longer interferes with locking pawl 56, allowing it to rotate downward into the locking position in which bearing surfaces 62 and 60 mate together. To insure that locking pawl 56 automatically moves to its locking position when latching member 52 moves to its latched position, locking pawl 56 is biased either by gravity or by a spring (not shown) towards its locking position. Once locking pawl is in its locked position, latching member 52 cannot rotate back to its unlatched position due to the engagement of bearing surface 62 with bearing surface 64. Release of clamp 40 requires that the operator manually rotate locking pawl 56 to the unlocked position by rotating release arm 60 towards the back face 24 of test device 10. Test device 10 can then be lifted off the steering wheel.

As shown in FIG. 6, this clamp arrangement is advantageous because it allows the test device to rotate away from the operator and towards the instrument panel in the event of an unexpected deployment of the driver's side airbag A. Not only does the test device move away from the operator, but it is held to the steering wheel to minimize the potential for injury to others. Referring back to FIG. 3, it should be noted that, to permit this rotation of the test device about the outer ring of the steering wheel, support blocks 42 do not contain any flange that might otherwise impede this rotation. Rather, support blocks 42 contact the outer ring only at the outermost surface of the outer ring. In this way, the support blocks provide lateral support for test device without interfering with rotation of the test device in the event of an airbag deployment.

Figure 7:
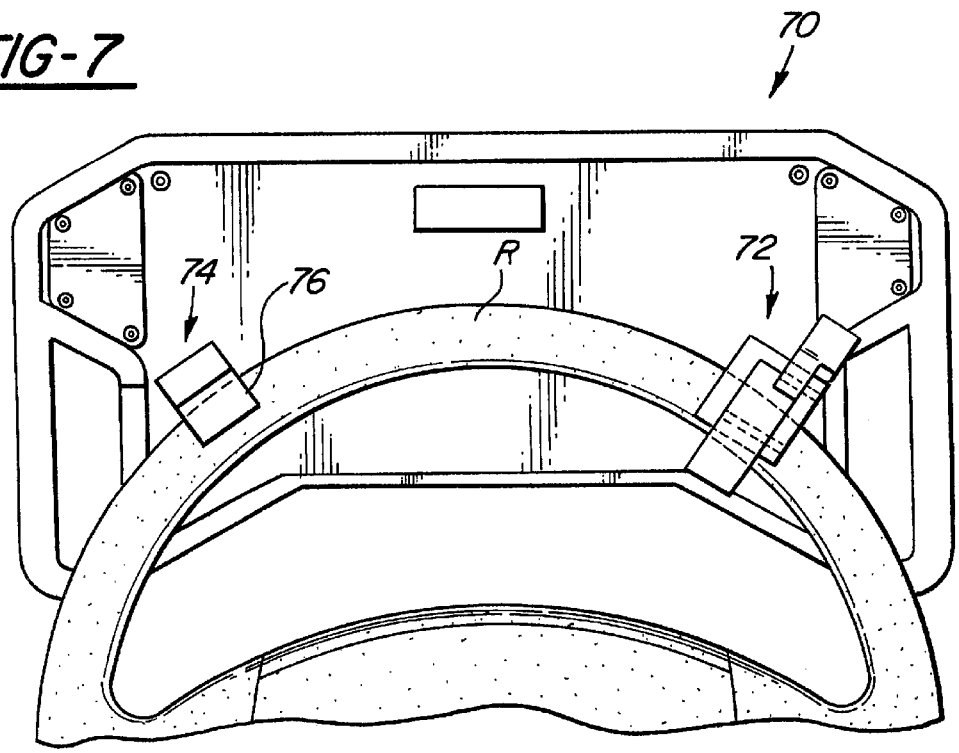
FIG. 7 is a rear view of a second embodiment of a diagnostic test device of the present invention, showing a modified form of the support arrangement of the test device of FIGS. 1–6.

Turning now to FIG. 7, there is depicted a second embodiment of the test device of the present invention. In this embodiment, test device 70 is the same as test device 10 of FIGS. 1–6, except that the clamp 72 is located to one side of the housing and the other support comprises a hanger 74. Clamp 72 can be identical to clamp 40, except that the release arm on the locking pawl need not extend laterally across the back face of the test device 70 due to the proximity of clamp 72 with the left side handle. Hanger 74 has a downwardly depending flange 76 that holds the right side of test device 70 in place on the steering wheel. Flange 76 extends only partially over the backside of the outer ring so that it can easily become disengaged from the outer ring should the test device have to rotate about clamp 72 due to deployment of the airbag.

Figure 8:
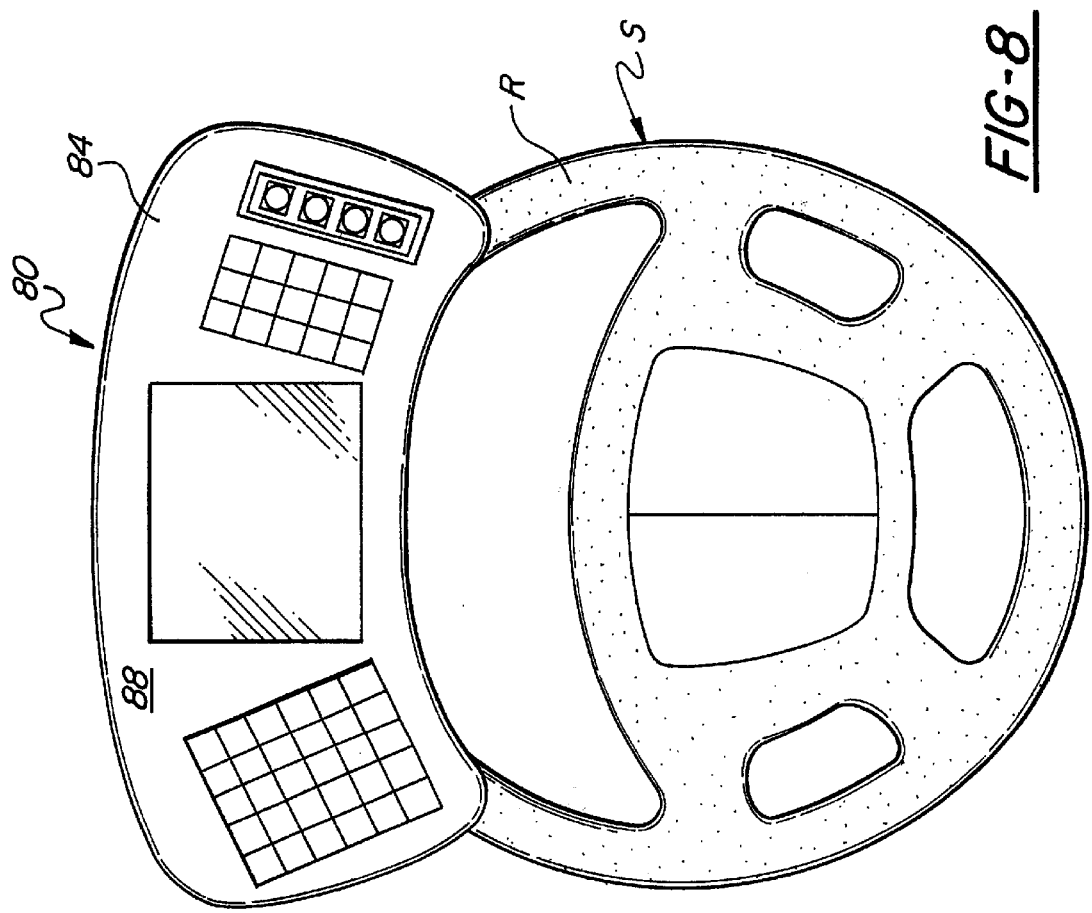
FIG. 8 is a front view of a third embodiment of a diagnostic test device of the present invention, showing another support arrangement for mounting the test device to the steering wheel.

Referring now to FIGS. 8 and 9, another arrangement for mounting the test device of the present invention is shown. In this embodiment, test device 80 includes a support in the form of a curved or arcuate slot 82 having a curvature and width selected to match that of the outer ring of the steering wheel. Given that the values of this curvature and width are substantially the same for the vast majority of manufactured vehicles, a single housing design can be used for numerous different vehicles from numerous different manufacturers. As will be appreciated, slot 82 allows test device 80 to be mounted on the outer ring without the need for any tooling. Furthermore, assuming slot 82 is designed to provide a snug fit over the outer ring, the curvature of the outer ring will prevent test device 80 from rotating forward or backwards out of position on the steering wheel. As will be appreciated, slot 82 replaces the supports used in the first two embodiments and, as with those supports, the location and depth of slot 82 within housing 84 can be selected such that test device 80 is high enough on the steering wheel that the distance between the lower surface of the housing and the geometric center of the steering wheel is greater than or equal to seventy percent (70%) of the radius of the outer ring of the steering wheel.

Although slot 82 is shown in FIG. 9 as being located adjacent the back face 86 of housing 84, it will be appreciated that slot 82 could be advantageously located adjacent front face 88 (and remotely from back face 86) so that the front face of housing 84 is nearly flush with the front surface of the steering wheel. As a result, housing 84 would mostly be located on the back side of the steering wheel well out of the way of a deploying airbag. This is especially useful given the more recent driver's side airbag designs which expand not so much in the direction of the driver, but more widely and much more closely to the surface of the steering wheel.

It will thus be apparent that there has been provided in accordance with the present invention a diagnostic test device which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

We claim:

1. A diagnostic test device for mounting to an automobile steering wheel having an outer ring connected to a center hub that houses an air bag, the test device comprising:

a housing having a control panel, an electronic circuit, and one or more supports adapted to mount said housing on the outer ring of the automobile steering wheel, said electronic circuit being contained within said housing and having at least one input for receiving diagnostic information from the automobile;

said housing having a lower surface, wherein said one or more supports are located relative to said lower surface such that said lower surface is located above the center hub of the steering wheel when said housing is supported on the outer ring of the steering wheel by said one or more supports;

wherein, when said housing is supported on the outer ring of the steering wheel by said one or more supports, the distance between each point on said lower surface of said housing and the geometric center of the outer ring of the steering wheel is greater than or equal to seventy percent (70%) of the radius of the outer ring.

2. A diagnostic test device as defined in claim 1, wherein said supports permit said housing to be mounted and dismounted from the outer ring of the steering wheel without any tooling.

3. A diagnostic test device for mounting to an automobile steering wheel having an outer ring connected to a center hub that houses an air bag, the test device comprising:

a housing having a control panel, an electronic circuit, and one or more supports adapted to mount said housing on the outer ring of the automobile steering wheel, said electronic circuit being contained within said housing and having at least one input for receiving diagnostic information from the automobile;

said housing having a lower surface, wherein said one or more supports are located relative to said lower surface such that said lower surface is located above the center hub of the steering wheel when said housing is supported on the outer ring of the steering wheel by said one or more supports;

wherein said one or more supports comprises an arcuate slot within a bottom side of said housing, said slot having a curvature substantially the same as that of an outer ring of an automobile steering wheel.

4. A diagnostic test device for mounting to an automobile steering wheel having an outer ring connected to a center hub that houses an air bag, the test device comprising:

a housing having a control panel, an electronic circuit, and one or more supports adapted to mount said housing on the outer ring of the automobile steering wheel, said electronic circuit being contained within said housing and having at least one input for receiving diagnostic information from the automobile;

said housing having a lower surface, wherein said one or more supports are located relative to said lower surface such that said lower surface is located above the center hub of the steering wheel when said housing is supported on the outer ring of the steering wheel by said one or more supports;

wherein said housing has a front face and a rear face with said control panel being located on said front face and wherein said one or more supports are located nearer said front face than said rear face.

5. A diagnostic test device for mounting to an automobile steering wheel having an outer ring connected to a center hub that houses an air bag, the test device comprising:

a housing having a control panel, an electronic circuit, and one or more supports adapted to mount said housing on the outer ring of the automobile steering wheel, said electronic circuit being contained within said housing and having at least one input for receiving diagnostic information from the automobile;

wherein said housing has a lower surface that includes a middle region and a pair of end regions, each of which extends downwardly from an opposite end of said middle region, and wherein said middle region is located above the hub of the steering wheel when said housing is secured to the outer ring of the steering wheel by said one or more supports.

6. A diagnostic test device as defined in claim 5, wherein, when said housing is supported on the outer ring of the steering wheel by said one or more supports, the distance between said lower surface of said housing and the geometric center of the outer ring of the steering wheel is greater than or equal to seventy percent (70%) of the radius of the outer ring.

7. A diagnostic test device as defined in claim 5, wherein each of said end regions extend downwardly from said middle region at an obtuse angle.

8. A diagnostic test device as defined in claim 5, wherein said middle region and said end regions of said lower surface together comprise an arcuate lower surface of said housing.

9. A diagnostic test device as defined in claim 5, wherein said one or more supports includes a clamp, said clamp having a latching member movable between an unlatched position in which said housing can be mounted or dismounted from the outer ring and a latched position in which movement of said housing relative to the outer ring is substantially limited to rotation of said housing about the outer ring at said clamp.

10. A diagnostic test device as defined in claim 9, wherein said one or more supports further comprises a support block spaced on said housing from said clamp, said support block being adapted to contact the outer ring only at the outermost surface of the outer ring, whereby said support block does not interfere with rotation of said housing about the outer ring.

11. A diagnostic test device for mounting to an automobile steering wheel having an outer ring connected to a center hub that houses an air bag, the test device comprising:

a housing having an electronic circuit and a clamp;

said electronic circuit having at least one input for receiving diagnostic information from the automobile; and said clamp having a latching member that is movable between an unlatched position in which said housing can be mounted or dismounted from the outer ring and a latched position in which movement of said housing relative to the outer ring is substantially limited to rotation of said housing about the outer ring at said clamp.

12. A diagnostic test device as defined in claim 11, wherein said latching member is adapted to move from said unlatched position to said latched position in response to said housing being hung onto the outer ring via said clamp.

13. A diagnostic test device as defined in claim 12, wherein said clamp further comprises a control link movable from a first position to a second position in response to said housing being hung onto the outer ring via said clamp, wherein movement of said control link from said first position to said second position causes said latching member to move from said unlatched position to said latched position, whereby said clamp automatically latches onto the outer ring when said housing is hung onto the outer ring.

14. A diagnostic test device as defined in claim 12, further comprising a locking member movable between an unlocked position in which said latching member can move between said latched and unlatched positions and a locked position in which said latching member is prevented from moving from said latched position to said unlatched position.

15. A diagnostic test device as defined in claim 14, wherein said locking member moves from said unlocked position to said locked position upon movement of said latching member from said unlatched position to said latched position.

16. A diagnostic test device as defined in claim 15, wherein said latching member and said locking member have complementary bearing surfaces that engage each other and prevent said latching member from rotating to said unlatched position when said latching member is in said latched position and said locking member is in said locked position.

17. A diagnostic test device as defined in claim 15, wherein said locking member is biased toward said locked position.

18. A diagnostic test device as defined in claim 11, further comprising at least one support spaced on said housing from said clamp.

19. A diagnostic test device as defined in claim 18, wherein said clamp is located to one side of said housing and said support is located towards an opposite side of said housing.

20. A diagnostic test device as defined in claim 18, further comprising a second support, wherein said supports are located on said housing and said clamp is located between said supports.

21. A diagnostic test device as defined in claim 18, wherein said one or more supports comprise one or more support blocks adapted to contact the outer ring only at an outer surface of the outer ring, whereby said one or more support blocks do not interfere with rotation of said housing about the outer ring.

* * * * *